United States Patent [19]

Wynn

[11] Patent Number: 5,155,482
[45] Date of Patent: Oct. 13, 1992

[54] AIRCRAFT FLUID VESSEL TESTING

[75] Inventor: Raythell Wynn, Valdosta, Ga.

[73] Assignee: The United States of America as represented by the Secretary of the Air Force, Washington, D.C.

[21] Appl. No.: 693,984

[22] Filed: Apr. 29, 1991

[51] Int. Cl.⁵ .............................................. G08B 21/00
[52] U.S. Cl. ................................... 340/945; 73/1 H; 340/515; 364/509
[58] Field of Search ............... 340/509, 514, 515, 945, 340/612; 73/1 H, 865.9, 304 C; 244/135 R, 135 C; 137/315; 364/509, 571.01, 571.04, 571.05, 571.08

[56] References Cited

U.S. PATENT DOCUMENTS

| | | | |
|---|---|---|---|
| 1,304,022 | 5/1919 | Cole. | |
| 1,414,298 | 4/1922 | Montero. | |
| 3,176,221 | 3/1965 | Stamler | 73/1 H |
| 3,333,469 | 8/2967 | Godfrey | 73/308 |
| 3,742,342 | 6/1973 | Schick | 323/4 |
| 4,147,050 | 4/1979 | Rubel et al. | 73/1 H |
| 4,162,478 | 7/1979 | Huber et al. | 340/514 |
| 4,178,802 | 12/1979 | Yamamoto | 73/313 |
| 4,441,157 | 4/1984 | Gerchman et al. | 73/1 H |
| 4,821,022 | 4/1989 | Jannotta | 340/514 |
| 4,918,619 | 4/1990 | Orloff | 340/945 |

OTHER PUBLICATIONS

General Radio Experimenter, vol. 30 No. 4, Sep. 1955, pp. 1-8, "A Calibrator for Aircraft Fuel Gages".

Primary Examiner—Jin F. Ng
Assistant Examiner—Brent A. Swarthout
Attorney, Agent, or Firm—Gerald B. Hollins; Donald J. Singer

[57] ABSTRACT

An electrical test set especially suited for use in correlating the fill sensor's output indication for a pressure vessel with a known vessel fill condition. The vessel may be the hydrazine fuel container for an aircraft such as the U.S. Air Force F-16 fighter aircraft. The tester enables sensor system evaluation while the vessel is yet dismounted and in the refilling and refurbishing shop. In addition to verification of known vessel fill and satisfactory operation of the vessel level sensing apparatus, the tester eliminates the variables and inconvenience attending verification of sensor system operation on the aircraft by way of a cockpit instrument. The tester is provided with external and internal electrical energy sourcing and with operator friendly controls compatible with the instrumentation system in the host aircraft.

7 Claims, 2 Drawing Sheets

AIRCRAFT FLUID VESSEL TESTING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of electrical testing of remotely sensed liquid containment vessels as are used in aircraft and other vehicles.

In the modern aircraft it is common practice to use the main thrust generating engine as a source of mechanical prime mover energy for driving a plurality of systems necessary for operation of the aircraft. According to this practice the main propulsion engine of the aircraft usually drives a source of electrical energy such as a generator or alternator, one or more hydraulic pumps, an environmental control system (including air conditioning and crew compartment pressurization apparatus) and possibly such additional items as fuel pumps, air compressors, and vacuum pumps.

Such drive arrangements, although quite satisfactory during normal operation of the aircraft, are attended by an inherent difficulty during failure of the aircraft engine even for a temporary time interval. Such failure can of course place the aircraft and its crew in an instantly threatening situation. This occurs particularly in the case of single engined military fighter aircraft where combat or malfunction related loss of main engine would, without other arrangements, make the aircraft instantly uncontrollable and also incapable of crew life support.

Since the failure of hydraulically powered flight control systems and the electrical system of an aircraft is of such critical importance, it is common practice in most aircraft designs to provide for temporary sources of at least electrical and hydraulic system energization—i.e., to provide sources which are not dependent on the main engine of the aircraft. In many World War II vintage aircraft for example it was common practice to include a small gasoline engine energized DC generator within the aircraft, in addition to the normal aircraft storage battery, in order to provide for emergency engine starting and for a continuous source of electrical energy.

In more modern aircraft of the commercial transport variety it has become common practice to include a gas turbine driven alternator or generator for use in both emergency flight conditions and as a source of grounded aircraft energy for cabin air conditioning, engine starting and other functions. In the modern fighter aircraft such as the F-16, it is also desirable to provide an emergency source of electrical energy and hydraulic pressure for use in controlling the aircraft during emergency flight situations—and to operate this source of emergency energy from a fuel supply that is separate and different from that of the main propulsion engine. A system of this type is often made to be automatic in operation in response to engine failure and provides the pilot with at least the capability to control the airborne craft for attitude righting, crew member ejection and possibly for even an emergency landing.

The use of a separate fuel supply for such an emergency power unit is desirable both from the consideration of possible interruption of the main engine fuel and in order to minimize the volume and weight taxes the emergency energy system. In the F-16 aircraft, for example, a tank or a vessel of some 102 pounds weight and 6.5 gallon capacity is provided for this emergency power unit (or EPU) fuel supply and this tank is filled with a fuel of high energy density such as the hydrazine compound that has been used in space vehicles. In the F-16 aircraft this tank or vessel is located in an EPU compartment situated behind the aircraft cockpit.

In view of the corrosive nature, flammability, health, and other hazards attending fuels such as hydrazine, it is found convenient to replenish the supply of these fuels by removing the containment vessel from the aircraft and performing both a fuel replenishment and other restoring of the vessel in a maintenance shop or some other non flight-line environment. Such restoring in a specialized environment is also desirable in view of the relatively small size of this vessel on the F-16 aircraft and especially in view of the need for more than simple fuel replenishment in order to reuse the vessel on the same or another aircraft. In particular in the F-16 aircraft the hydrazine emergency power unit fuel vessel is operated in a sealed condition during normal use of the aircraft and is gas pressurized automatically upon the occurrence of an event requiring emergency power unit operation. This transfer from sealed to pressurized fluid operating condition is achieved by way of an expendable "burst disc" which is ruptured by a charge of pressurized nitrogen gas supplied automatically to the fuel vessel when emergency power unit operation is needed.

For both keeping the aircraft pilot appraised of the possible emergency power unit operating time remaining and for convenient ground check out of the emergency power unit fuel supply it is desirable to indicate the quantity of fuel remaining in this tank to the aircraft pilot by way of a cockpit received gauge or instrument. In the case of hydrazine fuel this remote sensing function can be conveniently provided by way of an electrical capacitance operated probe member received in the emergency power unit "EPU" fuel supply vessel.

Practical experience has shown that normal operation and maintenance of a group of aircraft provided with this EPU system can be attended by a number of inconveniences and labor increasing factors that are deserving of improvement, however. For example, whenever an F-16 aircraft has incurred an EPU automatic start-up event it is necessary for the ground crew of the aircraft to remove the hydrazine tank, replace the pressure sealing "burst disc" in the tank (a step which includes tipping the tank on end to remove hydrazine from the disc area), fill the tank with fuel using a weight determination of 100% filling, and then return the tank to the aircraft and verify that the sensor system instrument in the cockpit indicates a 100% full condition.

In the event of a cockpit instrument indication of something other than 100% tank filling, an event which happens with undesirable frequency in real world settings, it is necessary for the ground crew to dismount the filled tank, a tank weighing 102 Pounds, and identify which of several possible sources for this weight to instrument disagreement is in need of correction. In view of the corrosive and water attracting nature of the hydrazine fuel it is found that the sources of this disagreement may include, for example:

1. A defective capacitance sensor element in the hydrazine tank.
2. A defective indicating instrument in the aircraft cockpit.

3. Defective aircraft wiring between the cockpit instrument and the hydrazine tank.
4. Contamination of the tether cable connector with moisture or hydrazine or both.
5. Similar contamination of the tank connector plug with moisture or hydrazine.
6. Absence of a 100% filling of the tank.
7. Other random and less frequently occurring malfunctions.

In view of the number of these possible difficulties and the relatively large number of possible combinations of these difficulties it is found that considerable time and labor can be saved by eliminating as many of them as possible while the tank is in the refurbishing and refueling shop. Such shop oriented check out is especially desirable where the refueled tank is to be carried perhaps hundreds or thousands of miles from a home base shop to an aircraft which has landed, after an EPU actuation event, at some distant air base or airport. The present invention is found to be of great value in reducing these practical difficulties.

The prior patent art discloses a number of fuel indicating and fuel system check out arrangements which are of general background interest with respect to the present invention. Included in these patents are the float assembly checking system of L. J. Jannotta as described in U.S. Pat. No. 4,821,022, the vehicle fuel quantity indicating apparatus of H. Wamamoto as disclosed in U.S. Pat. No. 4,178,802, and the measuring transducer apparatus of G. Schick as disclosed in U.S. Pat. No. 3,742,342. Also included in these prior patents is the fuel level warning system of R. V. Godferay as disclosed in U.S. Pat. No. 3,333,469, the vehicle fuel indicator of J. C. Montero as disclosed in U.S. Pat. No. 1,414,298 and the electrical indicating device of S. F. Cole as disclosed in U.S. Pat. No. 1,304,022. None of these prior patents, however, teaches the arrangement of an aircraft fuel system check out apparatus and its use as Provided in the present invention.

SUMMARY OF THE INVENTION

The present invention provides labor saving maintenance shop check out apparatus for a tank liquid level sensing system and provides a method for using this apparatus. The invention provides realistic simulation of the tank environment conditions on the host aircraft while the tank is yet conveniently available for re-emptying and correction of sensing system difficulties.

It is therefore an object of the invention to provide an aircraft liquid supply tank check out system that is conveniently usable in a maintenance shop environment.

It is also an object of the invention to provide a liquid tank sensor check out system that faithfully simulates the operating environment of the sensor system in the aircraft.

It is another object of the invention to provide a tank sensor system check out apparatus which is useful in diagnosing sensor system defects.

It is another object of the invention to provide a low cost and easily fabricated sensor system check out apparatus.

It is another object of the invention to provide a method for restoring a remotely sensed pressurable liquid supply vessel for an aircraft to a refurbished and reusable condition.

It is another object of the invention to provide a method for detecting sensor system malfunctions in a tank and accomplishing their correction.

It is another object of the invention to provide a tank refurbishing test apparatus which operates from a choice of internally contained or externally supplied electrical energy.

These and other objects of the invention are achieved by the method for restoring a sealable, remotely liquid level sensed, and controllably pressurized liquid containment vessel for an aircraft comprising the steps of; removing said vessel from said aircraft; replacing an expendable pressure seal member at the pressure inlet aperture of said vessel; refilling said vessel with liquid to a predetermined percent of capacity; connecting a portable electronic liquid level indicating instrument to a liquid level sensing element portion of said vessel while said vessel is filled to said predetermined percent of capacity and yet removed from said aircraft; comparing the difference between refilling predetermined percent of capacity and a degree of filling indication by said level indicating instrument with a predetermined accuracy criteria; correcting vessel related causes of fullness indications falling outside of said predetermined accuracy criteria; said correcting including removing liquid from said vessel plus repairing and replacing component parts thereof as needed; repeating said refilling, connection, and comparing steps as needed to obtain a full vessel together with a full liquid level indication on said liquid level indicating instrument; returning said filled and correct level indicating instrument to said aircraft.

Additional objects and features of the invention will be understood from the following specification and claims.

DETAILED DESCRIPTION

Figure 1:
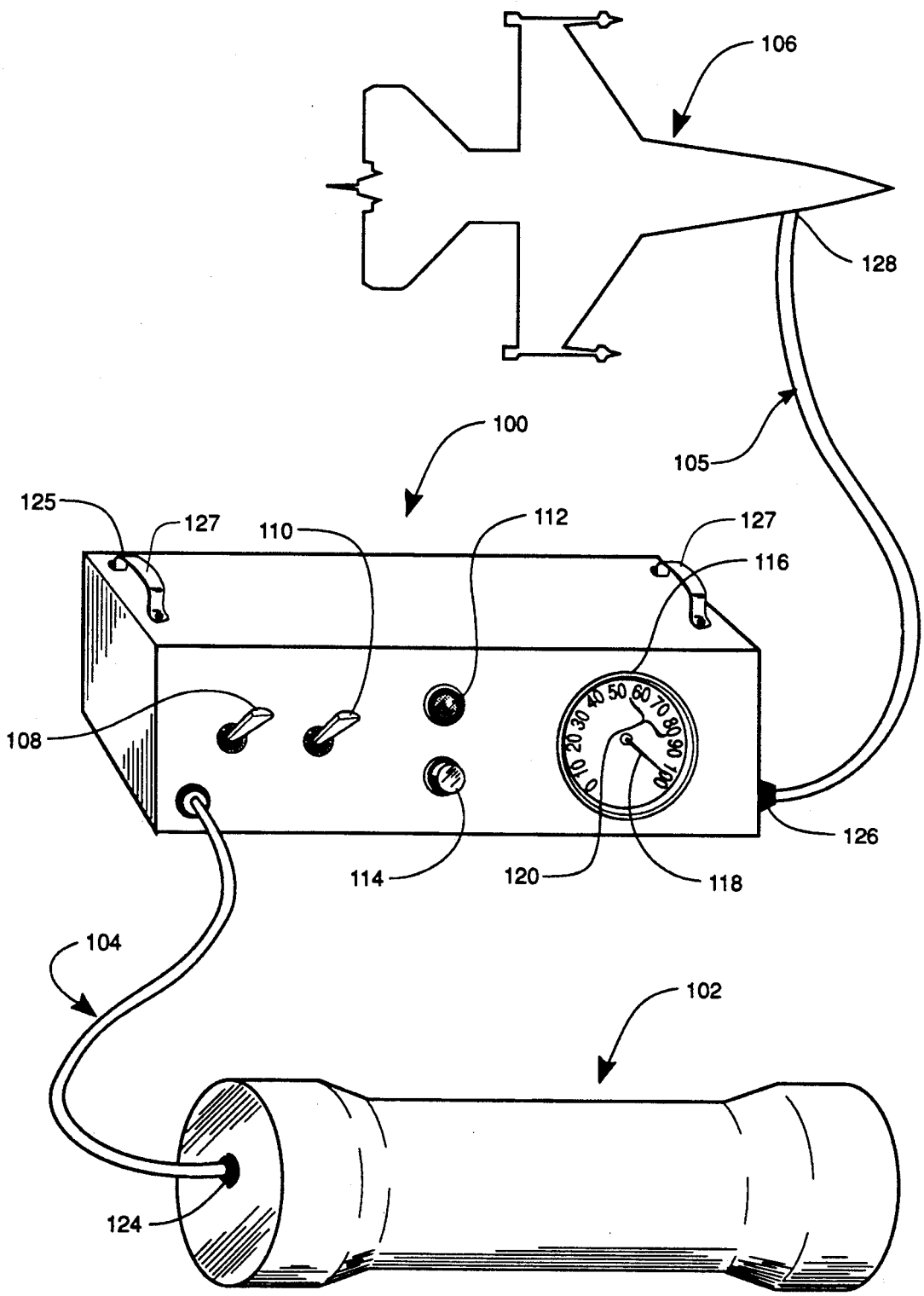
FIG. 1 shows an overall view of a testing apparatus according to invention together with a typical vessel and the aircraft associated therewith.

FIG. 1 in the drawings shows a hydrazine tank testing apparatus 100 together with a plurality of tether connections therefor. A related pressure vessel 102 and aircraft such as the F-16 fighter aircraft are also shown at 106 in FIG. 1. The testing apparatus 100 is shown to include a pair of manually operatable electrical switches 108 and 110, a test lamp 112, a circuit breaker of for example 5 amp. capacity 114, and a percentage of fill indicating instrument 116. The instrument 116 includes a fill indication scale 120 which is graduated between 0 and 100 percent and a movable pointer member 118 which indicates values along the scale 120. As indicated in the herein included Table 1 list of component parts, the instrument 116 may be of the same type and same federal supply number as the instrument used in the aircraft 106 for indicating quantity of hydrazine fuel present in a vessel or tank of the 102 type when installed in an aircraft.

Also shown in FIG. 1 are the tester housing 124 which may be about 6×8×14 inches in size, and include the handles 127, the connecting cables 104 and 105 by which the tester is electrically connected with the pressure vessel 102 and the aircraft 106. These electrical cables are terminated in connecting plugs of the commercially available "CANNON" type as are generally illustrated at 124 and 126 in FIG. 1. A connecting plug of a similar nature or other connection arrangements may be used for joining the tester 100 to the aircraft 106 at the location 128 indicated in FIG. 1.

Figure 2:
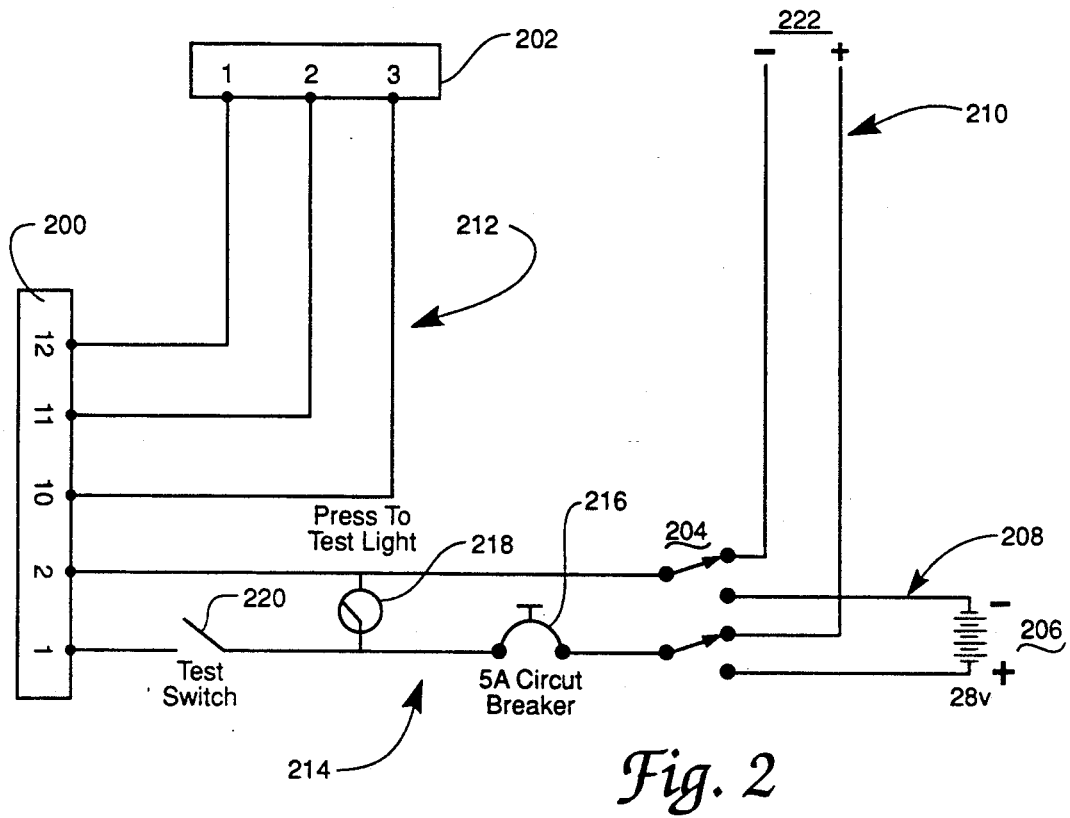
FIG. 2 in the drawings shows an electrical schematic diagram of the FIG. 1 testing apparatus.

Additional details of the FIG. 1 tester are shown in the form of the electrical schematic diagram in FIG. 2 of the drawings. In FIG. 2 the electrical connector which mates with the instrument 116 is shown at 200 while the electrical embodiment of the cable 104 is shown at 212 and the connector plug 124 is shown in electrical form at 202. Additionally shown in FIG. 2 are the electrical embodiment of the test switch 108 shown at 220, the electrical diagram for the press to test light 112 shown at 218, a schematic symbol for the circuit breaker 114 at 216, and the energy source selector switch 110 which appears at 204 in FIG. 2.

The tether cable connection with a direct current source of energy indicated at 128 in FIG. 1 is shown at 222 in FIG. 2 and the attending electrical cable 105 is shown at 210 in FIG. 2. As is indicated at 206 and 208 in FIG. 2 the disclosed arrangement of the invention contemplates the presence of a source of direct current energy within the housing 124 of the testing apparatus 100 in FIG. 1. This internal source of energy is represented by the battery 206 in FIG. 2 which may be embodied in the form of a 28 volt collection of primary or rechargeable cells. Energy from the battery 206 is supplied to the selector switch 204 by way of the conductors 208. The selector switch 204 may be of the double pole double throw variety of switch as is commonly available in the electrical art and as is identified in the Table 1 listing herein.

In combination the two sources of energy 206 and 222 together with the switch 204, the circuit breaker 216, the test light 218, and the test switch 220 comprise a DC energization path for the instrument 116, this path being generally indicated at 214 in FIG. 2 and terminating in the appropriate pin connections of the connector 200. The electrical leads 212 serve to connect the internal circuitry of the capacitance operated indicating instrument 116 in FIG. 1 with the tank or pressure vessel mounted sensing unit. The instrument and sensing unit combination does not require the addition of electrical components within the tester.

Operation of the FIG. 1 and FIG. 2 described tester requires connection of the cable 104 and the connecter 124 to the tank under test, Placing the selection switch 110 in the appropriate internal or external power position, pressing the test light 112 to verify that energization of the tester has occurred, placing the test switch 108 in the read or closed position, and reading the indicating instrument 116. The percentage of fill indication read from the instrument 116 is especially useful in verifying or correlating with the degree of tank filling determined from a weight criteria during a tank filling operation.

When used with an external source of direct current energy such as the aircraft 106 the tester use Procedure is modified by connecting the cable 105 to a source of DC energy within the aircraft 106 or to another external source of DC energy as is appropriate and changing the position of the DC power selection switch 110-204.

Figure 3:
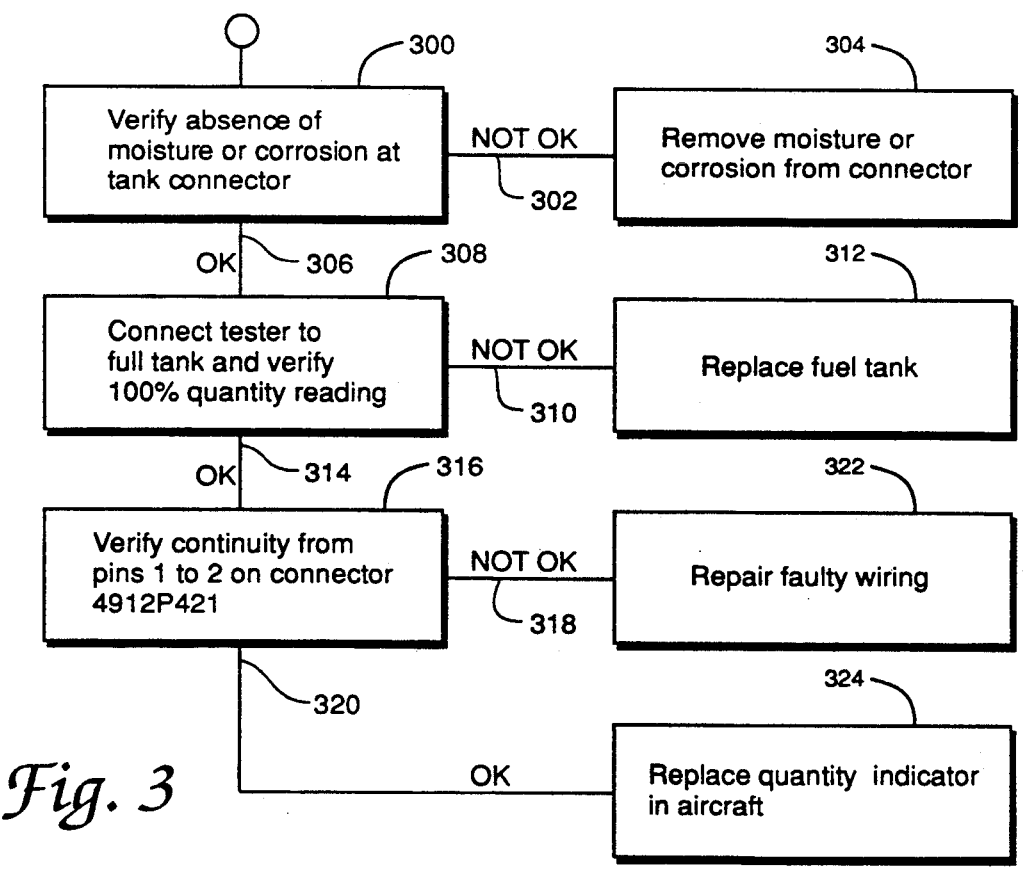
FIG. 3 shows a flow diagram for use of the FIG. 1 test apparatus.

FIG. 3 in the drawings shows additional details of a use procedure for the FIG. 1 and FIG. 2 tester. In FIG. 3, the blocks 300, 308, and 316 represent a sequence of decisions to be made in the course of a tank testing sequence and the blocks 304, 312, 322, and 324 indicate a series of corrective steps to be accomplished upon identification of a difficulty in the pressure vessel sensing system. The steps of FIG. 3 represent a procedure which is appropriate for use when a tank known to be filled has been placed into position on the aircraft and found to produce a cockpit instrument reading other than one hundred percent of capacity or when the tank to cockpit indicator system is otherwise known to be defective. In the blocks 300 and 304 of FIG. 3, the presence of moisture and the correction of a detected moisture condition in the connectors which join the fuel tank and the aircraft cockpit instrument is provided for.

Emergence from the test of block 300 along the path 302 indicates the need for moisture correction. This correction may be accomplished with physical cleaning and compressed air blowing or other techniques known in the art. Emergence from the test of block 300 along the path 306 indicates passage of the moisture test and, readiness of the tank for verification of the contents on the instrument 116. Emergence from the block 308 along the path 310 indicates the need for replacement of the tank sensor which is most easily accomplished by replacing the complete tank assembly (and repairing it later in an offline situation) as is indicated by the box 312. Emergence from the block 308 test along the path 314 indicates a satisfactory tank fullness reading on the instrument 116 and location of the pursued cockpit reading error in another part of the system. Emergence along the path 314 therefore indicates the appropriateness of verifying electrical continuity in the aircraft wiring, and of a possibly defective cockpit indicator instrument. Testing for these defects is indicated in the block 316 and repair of defective wiring is indicated at 322 and accessed by the path 318. In those situations wherein all of the testing of blocks 300, 308 and 316 is successful, emergence from the block 316 along the path 320 occurs and replacement of the aircraft cockpit instrument is appropriate in order to correct the pursued difficulty and achieve the desired cockpit instrument indication. Such replacement is indicated by the block 324.

The present invention therefore provides a major savings in manpower and a major convenience improvement in the servicing of pressure vessels such as the H-70 hydrazine electrically metered tank for an F-16 aircraft. The invention is especially useful in situations where partial consumption of the hydrazine fuel in such an aircraft has occurred and a remote landing of the aircraft has ensued. In this scenario, the ability to verify satisfactory operation of the tank and its metering system at the home base shop, and prior to travel to the downed aircraft location is a major savings in maintenance work effort. The described testing apparatus and method are also useful in routine maintenance shop activities concerned with such aircraft and in the diagnosis of defects in the emergency power unit system.

While the apparatus method herein described constitute a preferred embodiment of the invention, it is to be understood that the invention is not limited to this precise form of apparatus or method and that changes may be made therein without departing from the scope of the invention which is defined in the appended claims.

TABLE 1
Component Part Identification

| Noun | Part Number | Stock Number | Price | Qty. | FIG. 1 Number |
|---|---|---|---|---|---|
| EPU Gauge | 521993 | 6680-01-048-2998WF | 902.82 | 1 EA | 116 |
| Connector Plug | M83723/75W1212N | 5935-01-169-4130 | 21.57 | 1 EA | 124 |
| Adapter | M83723/24R1809 | 5935-01-106-6739 | 17.69 | 1 EA | |
| Connector Plug | M83723/75R1005N | 5935-00-005-2838 | 10.26 | 1 EA | 126 |
| Adapter | G7031-10NFG | 5935-01-230-8340 | 9.48 | 1 EA | |
| Adapter | G7031-18NFG | 5935-01-319-2430 | 9.48 | 1 EA | |
| Switch | MS35059-26 | 5930-00-715-7880 | 5.73 | 1 EA | |
| Light Assy | MS25331-6 | 6210-00-929-4104 | 20.00 | 1 EA | 112 |
| Circuit Breaker | MS2451-5 | 5925-00-837-7944 | 20.00 | 1 EA | 114 |
| Switch | MS35059-21 | 5930-00-247-7869 | 5.00 | 1 EA | |
| Cable | 16 AWG | 6145-00-112-8627 | 7.10 | 20 FT | 104 |
| Sheet Metal | 863.-H-37 | 9535-00-167-2216 | 10.56 | 4 FT | 105 |
| Nut Plate | F52LHTA521M02 | 5310-00-764-2391 | 2.36 | 10 EA | |
| Rivet | AN426AD4-6 | 5320-00-005-6256 | 1.10 | 12 EA | |
| Rivet | CCR264553-4 | 5320-00-117-6951 | 1.10 | 18 EA | |
| Grommet | | 5325-00-291-0302 | .30 | 8 EA | |
| Wire | 18 AWG | 6145-01-152-0628 | 3.10 | 6 FT | |
| Cap | | 5325-00-359-6844 | .50 | 2 EA | |
| Socket | | 5325-00-276-4946 | .20 | 2 EA | |
| Stud | | 5325-00-276-4908 | .50 | 2 EA | |
| Post | | 5325-00-276-4978 | 5.10 | 2 EA | |
| Webbing | | 8315-00-253-6277 | 5.10 | 4 FT | |

I claim:

1. Portable testing apparatus for verifying degree of fill and diagnosing degree of fill indication errors in a type H-70 nitrogen pressurizable liquid level sensing element inclusive emergency power generator hydrazine fuel supply tank, of six to seven gallons capacity and one hundred two pounds full weight, removed from an F-16 military aircraft comprising the combination of:

a first capacitance transducer operated hydrazine fuel level indicating electronic instrument, identical with a cockpit mounted hydrazine tank indicating instrument normally received in said F-16 aircraft, said first instrument being received in a portable housing which also includes a twenty-eight volt direct current internal energy source and has first and second tether cables connectable respectively with said removed type H-70 tank and with either said F-16 aircraft or another aircraft;

multiple circuit manually matable and segregatable electrical connector means disposed at selected ends of said first and second tether cables and matable with complementing connector members on a selected one of said aircraft and on said removed, under test, H-70 fuel tank for enabling temporary electrical connection of said testing apparatus therewith;

manually operable electrical switching means received adjacent said first electronic instrument on a control panel portion of said portable housing for selecting one of said internal twenty-eight volt direct current energy source and a first tether cable accessed source of energy in one of said aircraft;

circuit interrupting means of both a manually operable and excessive current responsive type located on said control panel and disposed in an energy flow path intermediate said selected energy source and said electronic instrument for manual and current magnitude control of energy flowing from said selected energy source to said electronic instrument;

luminous signalling means, including a push to test operating arrangement, received on said control panel for indicating the presence of energy from said selected energy source at said electronic instrument;

means including a tank weight responsive measurement apparatus and a replacement expendable tank pressure sealing member for filling and pressure sealing said removed type H-70 tank to a known and substantially full condition with said hydrazine fuel; and means for comparing a difference between an indication from said first electronic instrument and a measurement from said tank weight responsive measurement apparatus, and indicating when said difference falls outside of a predetermined accuracy criteria, thereby indicating that corrective action should be taken with respect to a defective liquid level sensing element.

2. The method for restoring a sealable, remotely liquid level sensed, and controllably pressurized liquid containment vessel for an aircraft comprising the steps of:

removing said vessel from said aircraft;

replacing an expendable pressure seal member at a pressure inlet aperture of said vessel;

refilling said vessel with liquid to a predetermined percent of capacity, and measuring the quantity of liquid input to the vessel by a measuring apparatus separate from the vessel;

connecting a portable electronic liquid level indicating instrument to a liquid level sensing element portion of said vessel while said vessel is filled to said predetermined percent of capacity and yet removed from said aircraft;

comparing the difference between said refilling predetermined percent of capacity and a degree of filling indication by said level indicating instrument with a predetermined accuracy criteria;

correcting vessel related causes of fullness indications falling outside of said predetermined accuracy criteria, said correcting including removing liquid from said vessel plus repairing and replacing component parts thereof as needed;

repeating said refilling, connecting, and comparing steps as needed to obtain a full vessel together with a full liquid level indication on said liquid level indicating instrument; and returning said filled and correct level indicating vessel to said aircraft.

3. The method of claim 2 wherein said vessel is the hydrazine fuel tank for an emergency power unit.

4. The method of claim 3 wherein said refilling step includes adding hydrazine fuel until said vessel attains a weight within a predetermined tolerance range of one hundred percent full weight.

5. The method of claim 4 wherein said correcting step also includes at least one of the steps of:

replacing said sensing element portion, cleaning the electrical connections between said sensing element portion and said portable electronic liquid level indicating instrument.

6. The method of claim 4 further including the step of replacing an electronic liquid level indicating instrument in the cockpit of said aircraft in response to a liquid level indication differing from said predetermined percent of capacity.

7. The method of claim 6 wherein said replacing step includes tipping said vessel on an end opposite said pressure seal member to remove remaining hydrazine liquid from the location of said pressure seal member.

* * * * *